(12) United States Patent
Naito

(10) Patent No.: US 6,356,592 B1
(45) Date of Patent: Mar. 12, 2002

(54) MOVING IMAGE CODING APPARATUS

(75) Inventor: Yukihiro Naito, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/209,763

(22) Filed: Dec. 11, 1998

(30) Foreign Application Priority Data

Dec. 12, 1997 (JP) ............................................. 9-362327

(51) Int. Cl.$^7$ ................................................. H04N 7/12
(52) U.S. Cl. ................................................. 375/240.29
(58) Field of Search ....................... 375/240.29, 240.24, 375/240.16; 348/420.1, 425.2, 425.3, 607, 608; 382/260, 263–264, 268, 275

(56) References Cited

U.S. PATENT DOCUMENTS

| | | | |
|---|---|---|---|
| 5,136,376 A | * 8/1992 | Yagasaki et al. | 348/384 |
| 5,299,019 A | * 3/1994 | Pack et al. | 375/240.13 |
| 5,361,105 A | * 11/1994 | Iu | 348/699 |
| 5,568,196 A | 10/1996 | Hamada et al. | 348/416.1 |
| 5,621,468 A | * 4/1997 | Kim | 348/416 |
| 5,686,962 A | * 11/1997 | Chung et al. | 348/402 |
| 5,724,098 A | * 3/1998 | Murakami et al. | 348/416 |
| 5,786,859 A | * 7/1998 | Ueno et al. | 348/416 |
| 5,875,003 A | * 2/1999 | Kato et al. | 348/699 |
| 6,028,965 A | * 2/2000 | Normile | 382/250 |

FOREIGN PATENT DOCUMENTS

| | | | | |
|---|---|---|---|---|
| EP | 0 589 220 A2 | * 3/1994 | ............ | H04N/7/13 |
| JP | 61-46684 | 3/1986 | ............ | H04N/7/12 |
| JP | 2-23786 | 1/1990 | ............ | H04N/7/13 |
| JP | 2-154588 | 6/1990 | ............ | H04N/7/13 |
| JP | 6-38197 | 2/1994 | ............ | H04N/7/12 |
| JP | 6-62392 | 3/1994 | ............ | H04N/7/12 |
| JP | 6-217291 | 8/1994 | ............ | H04N/7/12 |
| JP | 7-231477 | 8/1995 | ............ | H04N/7/32 |
| JP | 7-240924 | 9/1995 | ............ | H04N/7/32 |
| JP | 7-288719 | 10/1995 | ............ | H04N/5/21 |
| JP | 8-18977 | 1/1996 | ............ | H04N/7/12 |
| JP | 9-54826 | 2/1997 | ............ | H04N/7/24 |

OTHER PUBLICATIONS

Takishima et al., "A Study of Adaptive Pre–filtering for Video Coding," Proceedings from the 1992 (7th) Picture Coding Symposium of Japan.

Takishima et al., "Adaptive Coding Control by Means of Variable Characteristics Prefilter," "1990 Autumn National Convention . . . The Institute of Electronics . . . ," Oct. 1–4, 1990, Part 6, pp 6–230.

Kronander, T., "Post– and pre–processing in coding of image sequences using filters with motion compensated history", ICASSP–88, Apr. 1988.*

* cited by examiner

*Primary Examiner*—Vu Le
(74) *Attorney, Agent, or Firm*—Foley & Lardner

(57) ABSTRACT

A moving image coding apparatus includes a coding section, an intraframe filter circuit, and a selector. The coding section predicts a pixel block in a current frame from a preceding frame by a motion compensation scheme, and performs orthogonal transformation and quantization for a predicted error, thereby coding the predicted error. The intraframe filter circuit performs intraframe filtering for each pixel of an input frame. The selector adaptively determines and sets the filter characteristic of the intraframe filter circuit on the basis of a pixel of the input frame and a corresponding pixel of a predicted image or adaptively selects an output from the intraframe filter circuit having an optimal filter characteristic.

22 Claims, 5 Drawing Sheets

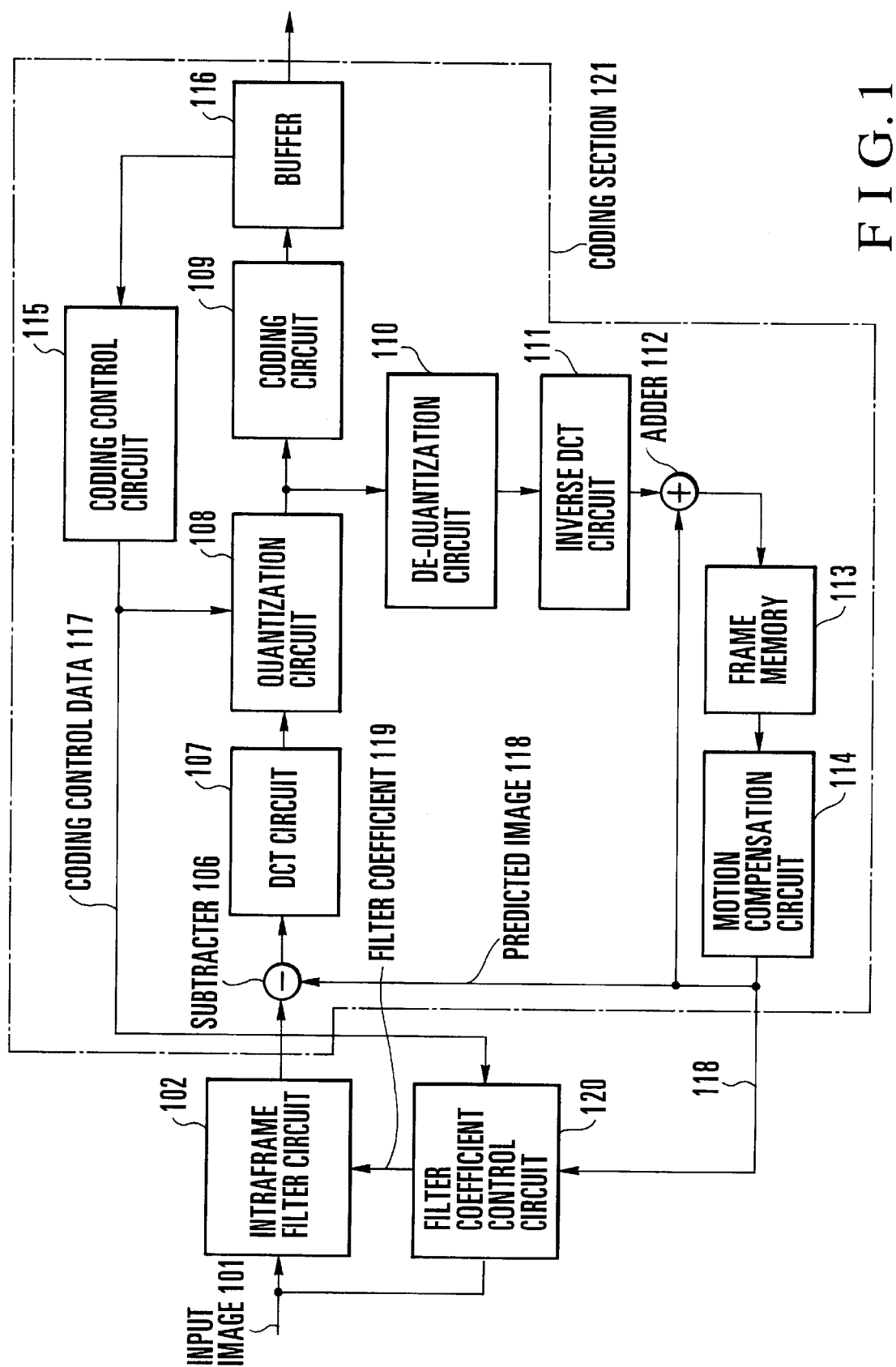
F I G. 1

MOVING IMAGE CODING APPARATUS

BACKGROUND OF THE INVENTION

The present invention relates to a moving image coding apparatus and, more particularly, to a moving image coding apparatus for performing coding operation by performing pre-processing using an intraframe filter.

In moving image compression coding, a moving image coding scheme based on a combination of motion compensation and orthogonal transformation is often used. Image data input to a coding apparatus contains high-frequency components due to noise. To prevent a deterioration in coding efficiency due to such high-frequency components, pre-processing is performed by using an intraframe filter. The above intraframe filter has the effect of removing high-frequency components that impair spatial correlation. The removal of such high-frequency components, however, leads to a decrease in resolution and a deterioration in image quality in a still area, in particular. A scheme for solving this problem is disclosed in, for example, Japanese Patent Laid-Open No. 2-154588. In this scheme, the filter strength is changed for the still and moving areas of a moving image such that a weak filter is used for the still area, and a strong filter is used for the moving area.

FIG. 5 shows a conventional moving image signal coding apparatus. An input image 1 is processed in units of pixel blocks (e.g., 16×16). A moving area determination circuit 4 compares each pixel of the input image 1 with a corresponding pixel of the previous frame stored in a frame memory 3 to determine a moving or still area. A filter coefficient 19 used by an intraframe filter circuit 2 is output on the basis of the determination result and coding control data 17 output from a coding control circuit 15. The intraframe filter circuit 2 filters the input image 1 by using the filter coefficient 19 and sends the resultant data to a coding section 5.

A subtracter 6 subtracts a predicted image 18 motion-compensated by a motion compensation circuit 14 from the pixel blocks sent to the coding section 5. The resultant data is processed by a DCT (Discrete Cosine Transform) circuit 7 and a quantization circuit 8 and coded by a coding circuit 9. The coded data is stored in the buffer 16. The output from the quantization circuit 8 is processed by a de-quantization circuit 10 and an inverse DCT circuit 11 in the coding section 5 and is added to the predicted image 18 by an adder 12. The resultant data is stored in a frame memory 13.

In the above conventional apparatus, all the pixels even in an area having undergone accurate prediction based on motion compensation are filtered by the strong filter if the area is a moving area. This unnecessarily decreases the resolution of the image.

Furthermore, in the conventional apparatus, the strong filter sometimes works on even an accurately predicted area. The effect of this filter may increase the difference between an input signal and a predicted signal even in such an area where the difference should be sufficiently small, resulting in a decrease in coding efficiency.

SUMMARY OF THE INVENTION

The present invention has been made to solve the above problems in the prior art, and has as its object to provide a moving image signal coding apparatus which can improve the coding efficiency using an intraframe filter while minimizing a decrease in the resolution of an image.

In order to achieve the above object, according to the present invention, there is provided a moving image coding apparatus comprising motion compensation type moving image coding means for predicting a pixel block in a current frame from a preceding frame by a motion compensation scheme, and performing orthogonal transformation and quantization for a predicted error, thereby coding the predicted error, intraframe filter means for performing intraframe filtering for each pixel of an input frame, and means for adaptively determining and setting a filter characteristic of the intraframe filter means on the basis of a pixel of the input frame and a corresponding pixel of a predicted image or adaptively selecting an output from the intraframe filter means having an optimal filter characteristic.

BRIEF DESCRIPTION OF THE DRAWINGS

FIG. 1 a block diagram showing an embodiment of the present invention;

DESCRIPTION OF THE PREFERRED EMBODIMENTS

Figure 2:
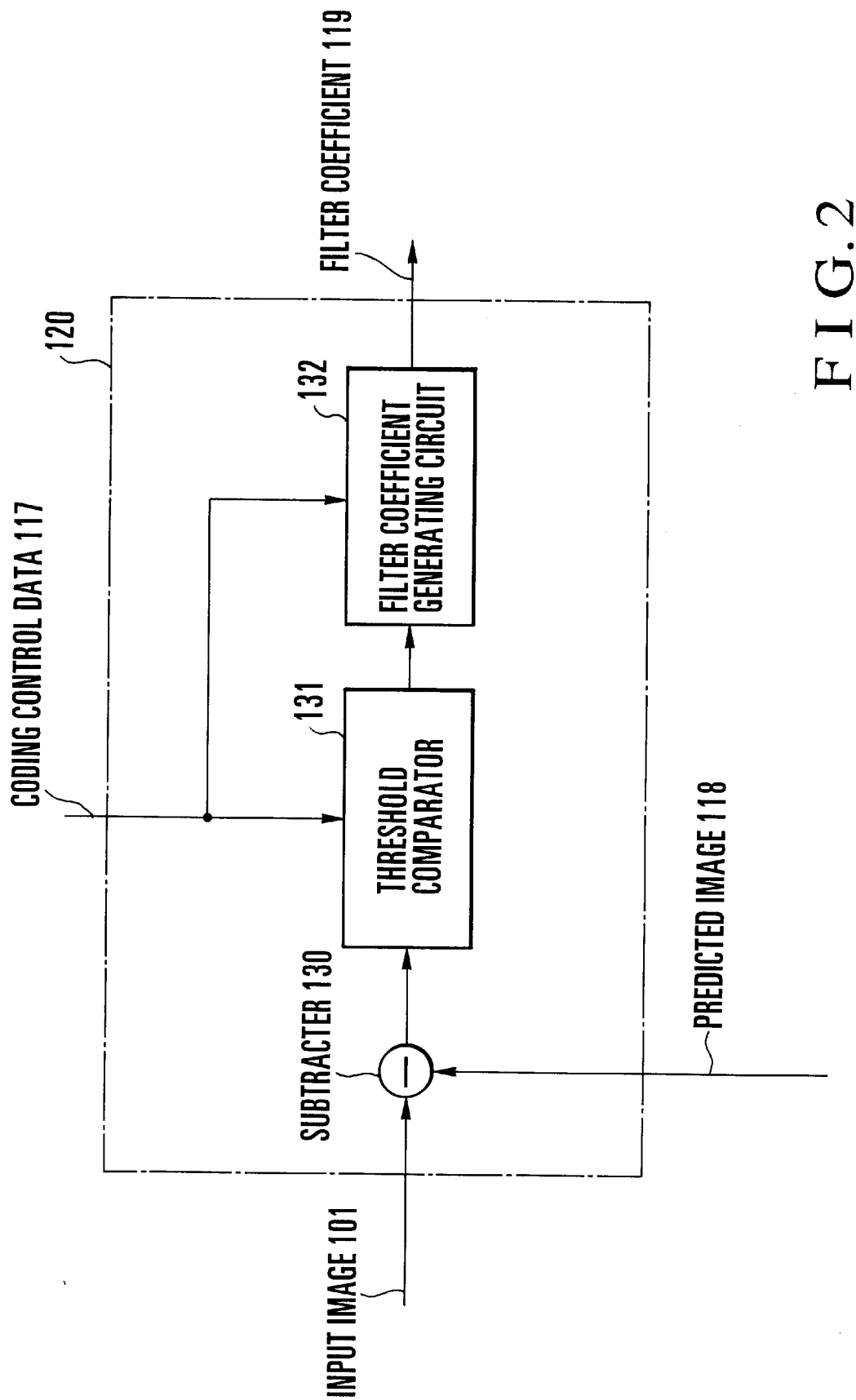
FIG. 2 is a block diagram showing the detailed arrangement of a filter coefficient control circuit in FIG. 1.

FIG. 1 shows an embodiment of the present invention. Referring to FIG. 1, a filter coefficient control circuit 120 determines a filter coefficient 119 on the basis of each pixel of an input image 101, a predicted image 118 output from a motion compensation circuit 114, and coding control data 117 output from a coding control circuit 115. An intraframe filter circuit 102 filters the input image 101 by using the filter coefficient 119, and outputs the resultant data to a coding section 121.

The coding section 121 calculates the difference between the output from the intraframe filter circuit 102 and the predicted image 118 by using a subtracter 106, codes the difference by using a DCT circuit 107, a quantization circuit 108, and a coding circuit 109, and outputs the resultant data to a buffer 116. The output from the quantization circuit 108 is processed by de-quantization circuit 110 and an inverse DCT circuit 111, and the resultant data is added to the predicted image 118 by an adder 112. The sum is stored in a frame memory 113.

FIG. 2 shows an arrangement of the filter coefficient control circuit 120. Referring to FIG. 2, a subtracter 130 calculates the difference between a pixel value of the input image 101 and a corresponding pixel value of the predicted image 118. A threshold comparator 131 then compares the absolute value of the difference with the threshold contained in the coding control data 117. A filter coefficient generating circuit 132 determines the filter coefficient 119 on the basis of the comparison result and the filter coefficient candidate contained in the coding control data 117.

The operation of this embodiment will be described next with reference to FIG. 1. The input image 101 is processed in units of pixel blocks (e.g., 16×16 pixels). The filter coefficient control circuit 120 determines the filter coefficient 119 on the basis of each pixel in each pixel block of the input image 101, a corresponding pixel in the predicted image 118, and the coding control data 117, and outputs the filter coefficient 119 to the intraframe filter circuit 102. The intraframe filter circuit 102 filters each pixel of the input image by using the filter coefficient 119.

The above filter coefficient determination and filtering are performed for all the pixels in each pixel block, and the resultant data is output to the coding section 121. The coding section 121 performs moving image coding based on a combination of motion compensation and DCT for the input pixel block. Since a filter coefficient is determined by using both the input image 101 and the predicted image 118 instead of using only the input image 101, control can be performed to weaken the effect of the filter (perform weak filter processing) for an accurately predicted area even if it is a moving area, thereby preventing an unnecessary decrease in resolution. This can also prevent a decrease in coding efficiency due to strong filter processing for an accurately predicted area.

The operation of the filter coefficient control circuit 120 will be described next with reference to FIG. 2. The filter coefficient control circuit 120 calculates the difference between a pixel value of the input image 101 and a corresponding pixel value of the predicted image 118 by using the subtracter 130. The threshold comparator 131 then compares the absolute value of the calculation result with the threshold contained in the coding control data 117. A plurality of filter coefficients are prepared in the filter coefficient generating circuit 132. Two types of candidates for strong and weak filter coefficients of these filter coefficients are designated in the coding control data 117.

If the comparison result obtained by the threshold comparator 131 indicates that the absolute value of the difference between the input image and the predicted image is larger than the threshold contained in the coding control data 117, the strong filter coefficient is selected and output to the intraframe filter circuit 102. Otherwise, it is determined that the corresponding pixel is in a still area or in a moving area that has been accurately predicted by motion compensation. As a result, the weak filter coefficient is selected and output to the intraframe filter circuit 2.

The coding control data 117 is prepared by the coding control circuit 115. The coding control data 117 contains information such as quantization step size used by the quantization circuit 108 in addition to one threshold used by the threshold comparator 131 and two types of filter coefficient candidates used in the filter coefficient generating circuit 132, as described above.

When the processing for the pixel block is complete, the coding control circuit 115 outputs the coding control data 117 for the next pixel block on the basis of the contents of the buffer 116 and the like. If the amount of information generated is large and may overflow the buffer 116, the threshold in the coding control data 117 is decreased to make it easy to select the strong filter. In addition, strong filter coefficients are set as two types of candidates. With this operation, since strong filter processing can be performed for the input image 101, the amount of information generated can be suppressed.

In contrast to this, if the amount of information generated is small and there is much free space in the buffer 116, the threshold in the coding control data 117 is increased to make it easy to select the weak filter. In addition, weak filter coefficients are set as two types of candidates. This can suppress a decrease in resolution due to unnecessary filter processing.

In this embodiment, of these filter coefficients, two types of candidates, i.e., strong and weak filter coefficients, are designated in the coding control data 117. However, n (n>2) filter coefficient candidates and n−1 thresholds may be set in the coding control data 117 in FIGS. 1 and 2. In addition, the threshold comparator 131 can be designed to determine the location of one of n areas in which the input absolute value is present, and the filter coefficient generating circuit 132 can be designed to generate n types of filter coefficients. With this arrangement, the number of types of filter coefficients can be increased from two, i.e., strong and weak filter coefficients, to n, thereby allowing finer image quality control.

Figure 3:
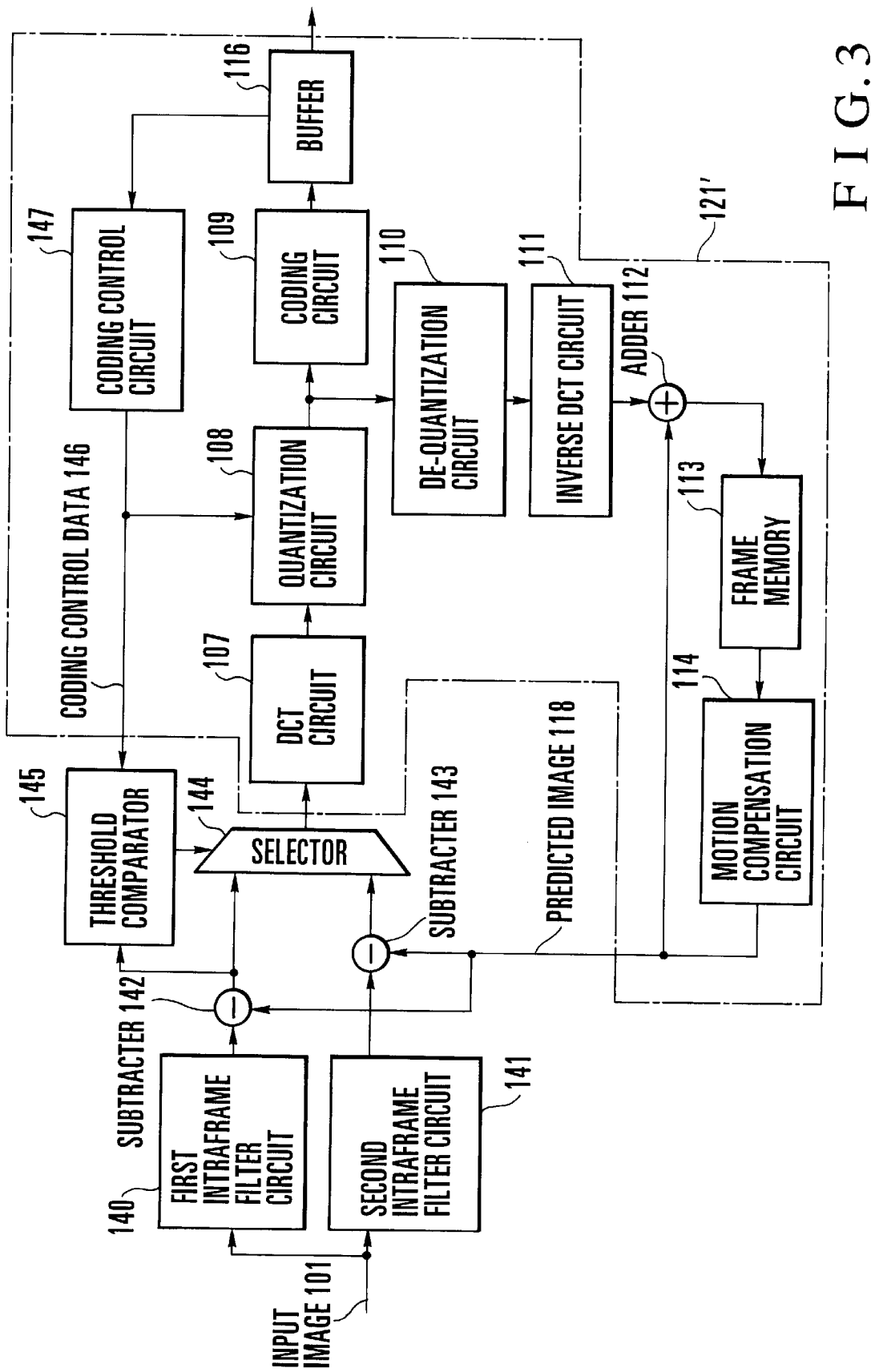
FIG. 3 is a block diagram showing another embodiment of the present invention.

FIG. 3 shows another embodiment of the present invention. In this embodiment, first and second intraframe filter circuits 140 and 141 are prepared as intraframe filter circuits. Assume that the filter coefficients in the respective intraframe filter circuits 140 and 141 are fixed, and one of the coefficients is a weak filter coefficient, and the other is a strong filter coefficient.

An input image 101 is filtered by the intraframe filter circuits 140 and 141, and the differences between the resultant data and a predicted image 118 are calculated by subtracters 142 and 143 and are input to a selector 144. A threshold comparator 145 compares the absolute value of the output from the subtracter 142 with the threshold in coding control data 146 and controls the selector 144 to select either the output from the intraframe filter circuit having a weak filter characteristic or the output from the intraframe filter circuit 141 having a strong filter characteristic. In this embodiment, since the filter coefficients in the intraframe filter circuits 140 and 141 are fixed, the arrangement of each circuit can be simplified and easily implemented as compared with the intraframe filter circuit 102 in which the filter coefficients change in units of pixels.

Referring t FIG. 3, the absolute value of the output from the subtracter 142 is compared with the threshold in the coding control data 146 by the threshold comparator 145. However, the absolute value of the difference between a pixel value of the input image 101 and a corresponding pixel value of the predicted image 118 may be compared with the threshold in the coding control data 146 by the threshold comparator 145.

Figure 4:
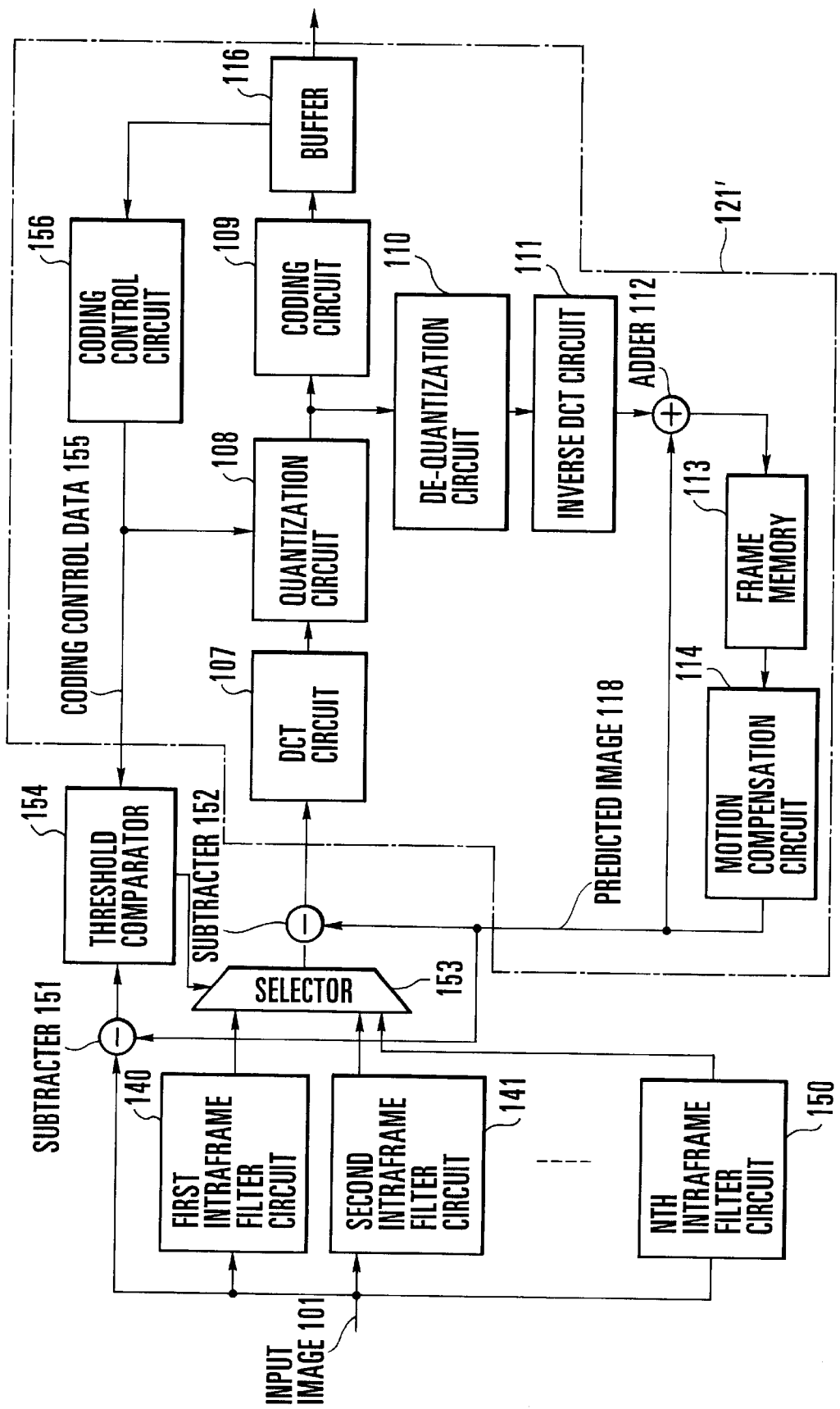
FIG. 4 is a block diagram showing still another embodiment of the present invention.
Figure 5:
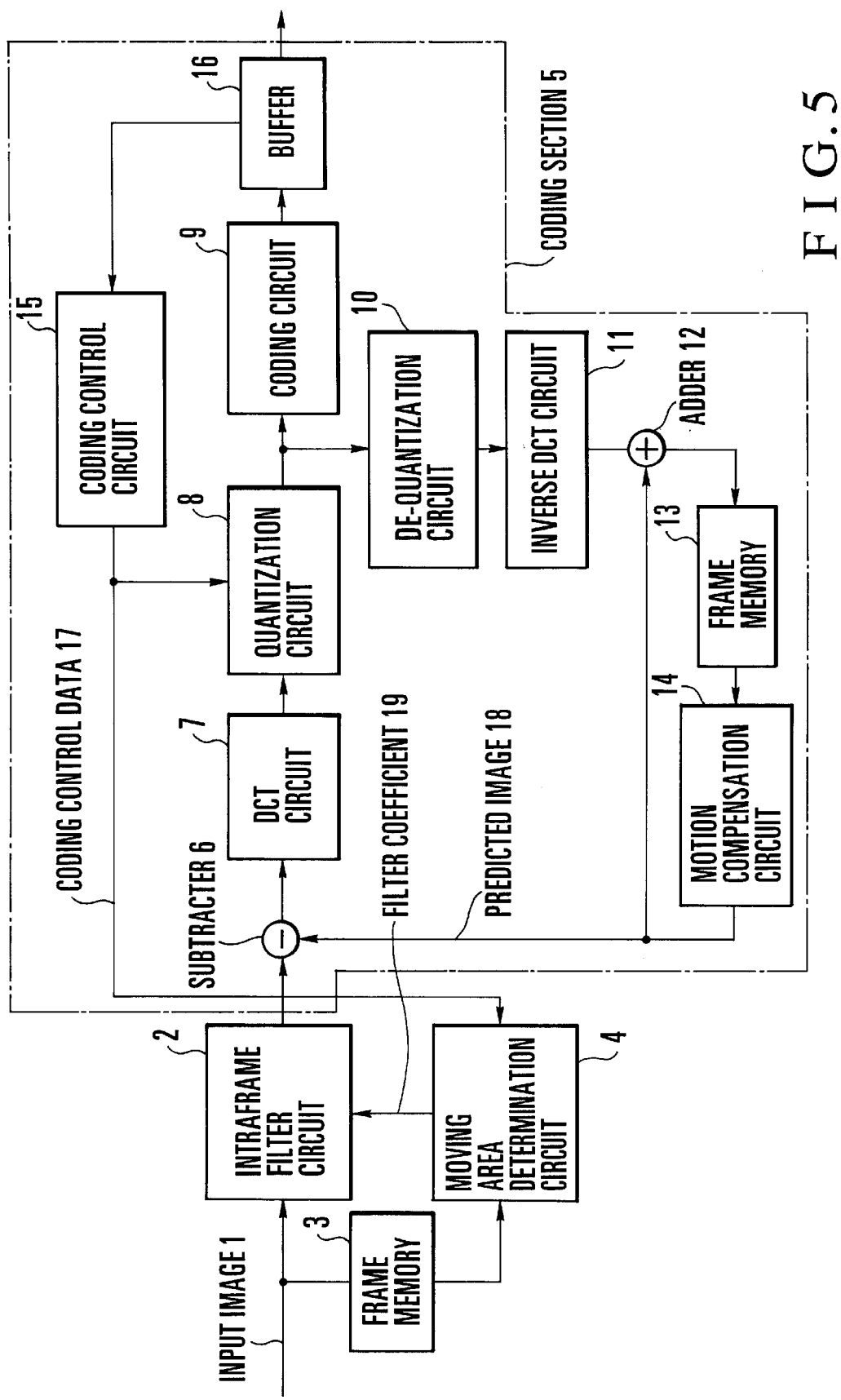
FIG. 5 is a block diagram showing a conventional moving image coding apparatus using an intraframe filter.

FIG. 4 shows still another embodiment of the present invention. This embodiment includes n (n>2) intraframe filter circuits. More specifically, the embodiment includes a total of n intraframe filter circuits from first and second intraframe filter circuits 140 and 141 to nth intraframe filter circuit 150. An input image 101 is input to each of these circuits. Fixed filter coefficients are set in these intraframe filter circuits. The images obtained by filtering the input image 1 with n types of filter strengths are input to a selector 153. A threshold comparator 154 receives the result obtained by calculating the difference between the input image 1 and a predicted image 118 using a subtracter 151 and the n−1 thresholds set in coding control data, and controls the selector 153 on the basis of these input data to select one of the n intraframe filter outputs. With this operation, the number of types of filter coefficients can be increased from two, i.e., strong and weak filter coefficients, to n, thereby allowing finer image quality control.

In the embodiments shown in FIGS. 3 and 4, the input image 1 is always output through the intraframe filters. However, the first intraframe filter circuit 140 in FIGS. 3 and 4 can be omitted. With this arrangement, each of the selectors 44 and 53 has a pixel free from intraframe filtering as a candidate to be selected with respect to the input image 1. As a result, the number of intraframe filter circuits can be decreased by one, and hence the apparatus size can be reduced. This attains a reduction in cost.

In the embodiments shown in FIGS. 3 and 4, the filter coefficients in the intraframe filter circuits 140, 141, . . . , 150 are fixed. However, these filter coefficients may be made variable. When the processing for the pixel block is complete, each of coding control circuits 147 and 156 determines the filter coefficient to be used for the next pixel block on the basis of the contents of the buffer 116, and sets it in each of the intraframe filter circuits 140, 141, . . . , 150. In this case, the coefficient in each of the intraframe filter circuits 140, 141, . . . , 150 does not change in units of pixels. This makes it easy to implement each intraframe filter circuit as compared with the intraframe filter circuit 2 in FIG. 1. In addition, since the filter coefficient can be changed in units of pixel blocks, sufficiently fine image quality control can be performed.

According to the moving image coding apparatus of the present invention, the coefficient in an intraframe filter is made variable or a plurality of intraframe filters are prepared, and a filter characteristic is determined on the basis of the difference between an input image and a predicted image. This can prevent an unnecessary decrease in resolution and improve the image quality. In addition, when the difference between the input image and the predicted image is small, a strong filter does not work on the corresponding pixel, and hence the difference is not increased. An improvement in coding efficiency can therefore be attained.

What is claimed is:

1. A moving image coding apparatus comprising:
    motion compensation type moving image coding means comprising a subtraction circuit having first and second inputs and an output connected to an encoder, said coding means for predicting a pixel block in a current frame from a preceding frame by a motion compensation scheme, and performing orthogonal transformation and quantization for a predicted error, thereby coding the predicted error;
    intraframe filter means for performing intraframe filtering for each pixel of an input frame and having an output connected to said first input of said subtraction circuit; and
    means, operative without the use of an activity signal indicating a variation of luminance intensities of pixels within an input frame, for adaptively determining and setting a filter characteristic of said intraframe filter means on the basis of a pixel of the input frame and a corresponding pixel of a predicted image or adaptively selecting an output from said intraframe filter means having an optimal filter characteristic on the basis of a pixel of the input frame and a corresponding pixel of a predicted image said pixels of said predicted image providing a predicted image signal to said second input of said subtraction circuit.

2. A moving image coding apparatus comprising:
    motion compensation type moving image coding means comprising a subtraction circuit having first and second inputs and an output connected to an encoder, said coding means for predicting a pixel block in a current frame from a preceding frame by a motion compensation scheme, and performing orthogonal transformation and quantization for a predicted error, thereby coding the predicted error; intraframe filter means for performing intraframe filtering for each pixel of an input frame while making a filter characteristic variable, said filter means having an output connected to said first input of said subtraction circuit; and
    filter characteristic setting means, operative without the use of an activity signal indicating a variation of luminance intensities of pixels within an input frame, for adaptively determining and setting filter characteristic of said intraframe filter means on the basis of a pixel of the input frame and a corresponding pixel of a predicted image said pixels of said predicted image providing a predicted image signal to said second input of said subtraction circuit.

3. An apparatus according to claim 2, wherein said intraframe filter means allows two types of filter coefficients corresponding to a strong filter characteristic and a weak filter characteristic to be set, and
    said filter characteristic setting means comprises threshold comparison means for selecting a strong filter coefficient when an absolute value of a difference between a pixel of the input frame and a corresponding pixel of the predicted image is larger than a predetermined threshold, and selecting a weak filter coefficient when the absolute value is smaller than the threshold.

4. An apparatus according to claim 3, further comprising means for decreasing the threshold and setting a strong filter coefficient as the filter coefficient when the amount of coded information generated is large and may overflow a buffer, and increasing the threshold and setting a weak filter coefficient as the filter coefficient when the amount of coded information generated is small and there is much free space in said buffer.

5. An apparatus according to claim 2, wherein said intraframe filter means allows filter coefficients corresponding to n (n>2) types of filter characteristics to be set, and
    said filter characteristic setting means comprises threshold comparison means for selecting and setting one of the n types of filter coefficients by comparing an absolute value of a difference between a pixel of the input frame and a corresponding predicted pixel with (n−1) thresholds.

6. An apparatus according to claim 5, further comprising means for decreasing the threshold and setting a strong filter coefficient as the filter coefficient when the amount of coded information generated is large and may overflow a buffer, and increasing the threshold and setting a weak filter coefficient as the filter coefficient when the amount of coded information generated is small and there is much free space in said buffer.

7. A moving image coding apparatus comprising:
    motion compensation type moving image coding means comprising a subtraction circuit having first and second inputs and an output connected to an encoder, said coding means comprising a subtraction circuit having first and second inputs and an output connected to an encoder, said coding means for predicting a pixel block in a current frame from a preceding frame by a motion compensation scheme, and performing orthogonal transformation and quantization for a predicted error, thereby coding the predicted error;
    a plurality of intraframe filter means for performing intraframe filtering for each pixel of an input frame with different filter characteristics and having an output connected to said first input of said subtraction circuit; and
    selection means, operative without the use of an activity signal indicating a variation of luminance intensities of pixels within an input frame, for adaptively selecting an optimal output of outputs from said intraframe filter means on the basis of a pixel of the input frame and a corresponding pixel of a predicted image said pixels of said predicted image providing a predicted image signal to said second input of said subtraction circuit.

8. An apparatus according to claim 7, wherein said plurality of intraframe filter means comprise two type of filter means constituted by filter means having a strong filter characteristic and filter means having a weak filter characteristic, and said selection means comprises threshold comparison means for controlling said selector means so as to select an output from said filter means having the strong filter characteristic when an absolute value of a difference between a pixel of the input frame and a corresponding predicted pixel is larger than a predetermined threshold, and selecting an output from said filter means having the weak filter characteristic when the absolute value is smaller than the threshold.

9. An apparatus according to claim 7, wherein said plurality of intraframe filter means comprise n (n>2) filter means having n types of filter characteristics, and said selection means comprises threshold comparison means for controlling selector means so as to select one of outputs from said n filter means by comparing an absolute value of a difference between a pixel of the input frame and a corresponding predicted pixel with (n−1) thresholds.

10. An apparatus according to claim 7, wherein said plurality of intraframe filter means have an operation of outputting an input image without performing intraframe filtering as a choice.

11. An apparatus according to claim 7, further comprising means for changing a filter coefficient in each of said plurality of intraframe filter means in units of pixel blocks.

12. A moving image coding apparatus comprising:

a motion compensation type moving image coding section comprising a subtraction circuit having first and second inputs and an output connected to an encoder, said coding section for predicting a pixel block in a current frame from a preceding frame by a motion compensation scheme, and performing orthogonal transformation and quantization for a predicted error, thereby coding the predicted error;

an intraframe filter circuit for performing intraframe filtering for each pixel of an input frame and having an output connected to said first input of said subtraction circuit; and a circuit, operative without the use of an activity signal indicating a variation of luminance intensities of pixels within an input frame, for adaptively determining and setting a filter characteristic of said intraframe filter circuit on the basis of a pixel of the input frame and a corresponding pixel of a predicted image or adaptively selecting an output from said intraframe filter circuit having an optimal filter characteristic on the basis of a pixel of the input frame and a corresponding pixel of a predicted image said pixels of said predicted image providing a predicted image signal to said second input of said subtraction circuit.

13. A moving image coding apparatus comprising:

a motion compensation type moving image coding section comprising a subtraction circuit having first and second inputs and an output connected to an encoder, said coding section for predicting a pixel block in a current frame from a preceding frame by a motion compensation scheme, and performing orthogonal transformation and quantization for a predicted error, thereby coding the predicted error;

an intraframe filter circuit for performing intraframe filtering for each pixel of an input frame while making a filter characteristic variable, said intraframe filter having an output connected to said first input of said subtraction circuit, and a filter characteristic setting circuit, operative without the use of an activity signal indicating a variation of luminance intensities of pixels within an input frame, for adaptively determining and setting a filter characteristic of said intraframe filter circuit on the basis of a pixel of the input frame and a corresponding pixel of a predicted image said pixels of said predicted image providing a predicted image signal to said second input of said subtraction circuit.

14. An apparatus according to claim 13, wherein said intraframe filter circuit allows two types of filter coefficients corresponding to a strong filter characteristic and a weak filter characteristic to be set, and said filter characteristic setting circuit comprises a threshold comparison circuit for selecting a strong filter coefficient when an absolute value of a difference between a pixel of the input frame and a corresponding pixel of the predicted image is larger than a predetermined threshold, and selecting a weak filter coefficient when the absolute value is smaller than the threshold.

15. An apparatus according to claim 14, further comprising a circuit for decreasing the threshold and setting a strong filter coefficient as the filter coefficient when the amount of coded information generated is large and may overflow a buffer, and increasing the threshold and setting a weak filter coefficient as the filter coefficient when the amount of coded information generated is small and there is much free space in said buffer.

16. An apparatus according to claim 13, wherein said intraframe filter circuit allows filter coefficients corresponding to n (n>2) types of filter characteristics to be set, and said filter characteristic setting circuit comprises a threshold comparison circuit for selecting and setting one of the n types of filter coefficients by comparing an absolute value of a difference between a pixel of the input frame and a corresponding predicted pixel with (n−1) thresholds.

17. An apparatus according to claim 16, further comprising a circuit for decreasing the threshold and setting a strong filter coefficient as the filter coefficient when the amount of coded information generated is large and may overflow a buffer, and increasing the threshold and setting a weak filter coefficient as the filter coefficient when the amount of coded information generated is small and there is much free space in said buffer.

18. A moving image coding apparatus comprising:

a motion compensation type moving image coding circuit comprising a subtraction circuit having first and second inputs and an output connected to an encoder, said coding circuit for predicting a pixel block in a current frame from a preceding frame by a motion compensation scheme, and performing orthogonal transformation and quantization for a predicted error, thereby coding the predicted error;

a plurality of intraframe filter circuits for performing intraframe filtering for each pixel of an input frame with different characteristics and having an output connected to said first input of said subtraction circuit; and a selection circuit, operative without the use of an activity signal indicating a variation of luminance intensities of pixels within an input frame, for adaptively selecting an optimal output of outputs from said intraframe filter circuits on the basis of a pixel of the input frame and a corresponding pixel of a predicted image said pixels of said predicted image providing a predicted image signal to said second input of said subtraction circuit.

19. An apparatus according to claim 18, wherein said plurality of intraframe filter circuits comprise two types of filter circuits constituted by a filter circuit having a strong filter characteristic and a filter circuit having a weak filter characteristic, and said selection circuit comprises a threshold comparison circuit for controlling said selector circuit so as to select an output from said filter circuit having the strong filter characteristic when an absolute value of a difference between a pixel of the input frame and a corresponding predicted pixel is larger than a predetermined threshold, and selecting an output from said filter circuit having the weak filter characteristic when the absolute value is smaller than the threshold.

20. An apparatus according to claim 18, wherein said plurality of intraframe filter circuits comprise n (n>2) filter circuits having n types of filter characteristics, and said selection circuit comprises a threshold comparison circuit for controlling said selector circuit so as to select one of outputs from said n filter circuits by comparing an absolute value of a difference between a pixel of the input frame and a corresponding predicted pixel with (n−1) thresholds.

21. An apparatus according to claim 18, wherein said plurality of intraframe filter circuits have an operation of outputting an input image without performing intraframe filtering as a choice.

22. An apparatus according to claim 18, further comprising a circuit for changing a filter coefficient in each of said plurality of intraframe filter circuits in units of pixel blocks.

* * * * *